(No Model.)

J. M. MACK.
NUT LOCK.

No. 272,565. Patented Feb. 20, 1883.

Witnesses
Chas. R. Burr
Wm A. Schoenborn

Inventor
John M. Mack
per O. E. Duffy
Atty.

UNITED STATES PATENT OFFICE.

JOHN M. MACK, OF CEDAR VALE, KANSAS.

NUT-LOCK.

SPECIFICATION forming part of Letters Patent No. 272,565, dated February 20, 1883.

Application filed December 20, 1882. (No model.)

*To all whom it may concern:*

Be it known that I, JOHN M. MACK, of Cedar Vale, in the county of Chautauqua and State of Kansas, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the class known as nut-locks for bolts, whereby the nut is locked in any desired position; and it consists in a nut-lock having a spring locking device embedded in the inner face of the nut and a slot or recess in the bore thereof, in combination with a bolt having a corresponding slot or recess, said locking device being provided with means for unlocking it when the nut is to be unscrewed, all of which will be more fully hereinafter described.

Figure 1:
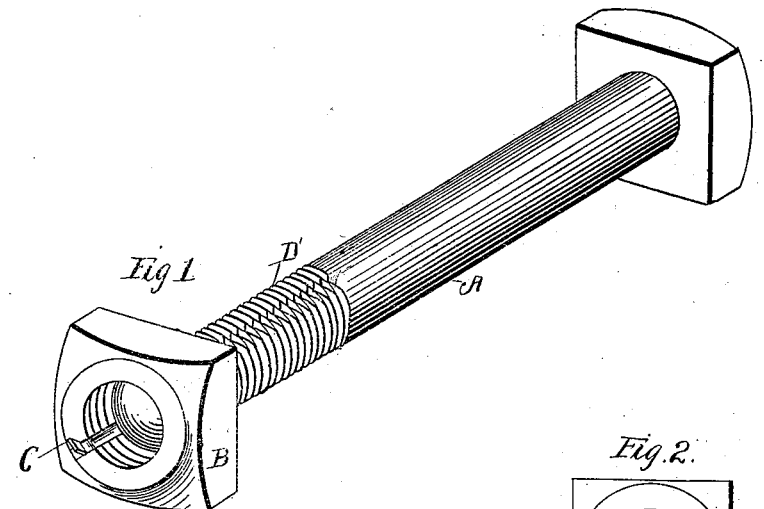
Figure 2:
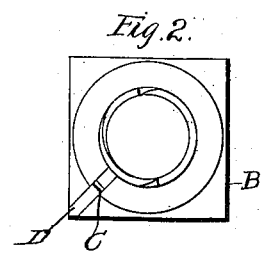
Figure 3:
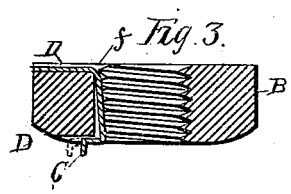
Figure 4:
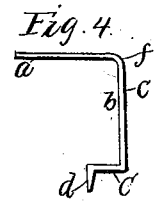
Figure 5:
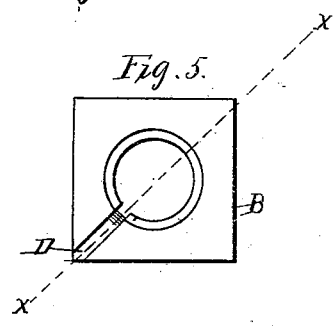
Figure 6:
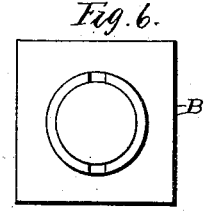

Referring to the accompanying drawings, Figure 1 represents a perspective view of a bolt having longitudinal beveled grooves and a nut attached, which clearly shows my nut-lock device. Fig. 2 shows the face of a nut and end view of the bolt, showing the bevel contour of the slots in which the nut-lock clutches. Fig. 3 shows a transverse section through the nut on a line taken at line $xx$, Fig. 5. The spring pawl nut-locking device is plainly shown in position in this figure. Fig. 4 shows a detached view of the locking device or spring-pawl. Fig. 5 shows the face of the nut having a square or rectangular groove; and Fig. 6 shows square or rectangular slots commencing in the end of the bolt, said slots continuing longitudinally the length of the thread of the bolt.

The same letters denote like parts in all the figures.

A is the bolt, and B the nut. C shows the spring-pawl or locking device, which is lodged and retained in slot D, formed in the nut. The slot D extends not only through the nut, but continues out on each of its faces, as shown in section, Fig. 3. D′ is a slot in the bolt, which extends transversely to the screw-threads on said bolt, this slot being to engage the spring-pawl or locking device. The slots D D′ may be rectangular or beveled both in the nut and in the bolt, so that the nut is rigidly held in position and prevented from turning in either direction until unlocked by depressing the spring-pawl C. If the beveled slot is preferred and a left-hand screw is to be used, the bevel is made from the opposite side from that now shown, the side of the slot intended to engage against the spring-pawl being deeper than its opposite side; but, as before observed, the square slot will fully answer all purposes, whether the screw be left hand or right.

It is preferred to make the spring-pawl locking device C as shown by Fig. 4, and to fasten the end of the spring well toward the periphery of the nut, for the reason that a greater elasticity is imparted to it by its long arm fastening. For a better understanding of the spring locking device I will describe it as having four parts integral and coefficient to each other— *i. e.*, the sides $a$, $b$, $c$, and $d$. $a$ is the fastening end or side, $b$ the locking side, and $c$ $d$ the unlocking portion. Whether the edges or sides of the spring are beveled or square, they may be made of this form, although they may be made of other and equivalent forms without departing from the spirit of my invention. It will be observed, however, that the corner $f$ of the spring nut-lock is rounding, so as to render it less liable to break, and to make it more yielding in its operation. It will also be observed that the slot in the outer face of the nut increases in depth as it nears the bore of the nut, (see Fig. 5,) by means of which the unlocking device has less resistance.

The operation is as follows: The bolt is provided with the longitudinal slot, as shown. The nut is also provided with the slots on its faces and through its bore. The spring locking device is then inserted in the slot of the nut and fastened at the end $a$ in such manner that its locking will lean slightly toward the center of the bore of the nut, by which its tension is increased, so that when the nut is screwed on, the spring will bear harder against its bearing in the bolts than if it had no lateral spring motion. The nut is now screwed on to its proper position, where it remains until unlocked. When it is desired to remove the nut, all that is necessary to be done is to depress the spring by means of the part $d$, when the nut can be readily unscrewed off the bolt.

I am aware that nut-locks have been made with springs and slots having spring-pawls operating on the periphery of the thread to prevent the nut from jarring off, all of which have more or less merit; but I am not aware that a spring-pawl made in one piece and operating for either right or left hand screw-bolts has ever before been made. I do not therefore claim, broadly, a lock-nut having a spring-pawl operating in a slot upon the periphery of a bolt; but What I do claim, and desire to secure by Letters Patent, is—

1. A nut-lock spring locking device embedded in the inner face of the nut, and in a slot or recess in the bore thereof, in combination with a bolt having a corresponding slot or recess, said locking device being provided with means for unlocking it when the nut is to be unscrewed, substantially as described.

2. A nut-lock consisting of the slotted nut provided with the spring-pawl, having a fastening end, a locking side, and a releasing end, as an article of manufacture.

In testimony that I claim the foregoing as my own I affix my signature in presence of two witnesses.

JOHN M. MACK.

Witnesses:
O. E. DUFFY,
B. F. MORSELL.